United States Patent [19]

Kopp

[11] Patent Number: 4,852,998
[45] Date of Patent: Aug. 1, 1989

[54] METHOD FOR MANUFACTURING METAL WIRES PARTIALLY COVERED WITH ABRASIVE PARTICLES FOR CUTTING TOOLS

[75] Inventor: Oswald Kopp, Nürtingen, Fed. Rep. of Germany

[73] Assignee: Kadia Diamond Hone Corporation, Rockford, Ill.

[21] Appl. No.: 153,595

[22] Filed: Feb. 8, 1988

[51] Int. Cl.[4] .............................................. B24D 3/02
[52] U.S. Cl. ....................................... 51/309; 29/458; 300/21
[58] Field of Search ................. 51/136, 263, 295, 307, 51/309, 357, 400; 300/21; 29/458

[56] References Cited

U.S. PATENT DOCUMENTS

| | | | |
|---|---|---|---|
| 3,762,895 | 10/1973 | Keeleric | 51/295 X |
| 3,983,357 | 9/1976 | Whitney, Jr. et al. | 51/295 X |
| 4,097,246 | 6/1978 | Olson | 51/309 |
| 4,370,149 | 1/1983 | Hara | 51/307 X |

Primary Examiner—Timothy V. Eley
Attorney, Agent, or Firm—Jones, Tullar & Cooper

[57] ABSTRACT

A method for the manufacture of metal wires partially covered with abrasive particles for cutting tools such as, for example, brushing tools equipped with bristles, endless band saws equipped with sawing wires, and the like, is characterized by the following steps: at least one metal wire to be covered is put onto a holder; one or more covering elements are placed over those areas of the metal wire which are to be kept free of abrasive particles; the holder equipped with the metal wire and the covering element(s) is dipped into an electrolytic bath into which have been introduced abrasive particles, by which means the areas of the metal wire kept free on the holder are coated or covered with a layer of a metallic carrier substance with partial embedding of a plurality of abrasive particles through electrolytic metal deposition. In this manner it is possible to produce metal wires partially covered with abrasive particles and thus brushing tools and other cutting tools in a considerably more economic way.

14 Claims, 5 Drawing Sheets

METHOD FOR MANUFACTURING METAL WIRES PARTIALLY COVERED WITH ABRASIVE PARTICLES FOR CUTTING TOOLS

BACKGROUND OF THE INVENTION

The present invention relates to a method and device for the manufacture of metal wires partially covered with abrasive particles for cutting tools such as, for example, brushing tools equipped with bristles, endless band saws equipped with sawing wires, and the like, and to bristles for brushing tools manufactured in this manner or by this method.

Up to now brushing tools, for example in the form of round brushes, flat brushes, roller brushes or the like, are being manufactured such that first the bristles, consisting of metal wires, are gathered and fixed to a disk, a shaft or the like in accordance with the shape of the brushing tool to be manufactured. Then the free ends of the bristles are covered with abrasive particles such that first the tool is covered by means of, for example, wax, while leaving free those areas which are to be covered with abrasive particles. Then the partially covered tool is dipped into an electrolytic bath containing abrasive particles where caps, which consist of a metal as a carrier substance and of abrasive particles partially imbedded therein, are placed on the free ends. In actual practice the brushing tool which is not yet covered with abrasive particles is altogether covered with a corresponding wax layer, so that prior to the electrolytic bath the free ends of the bristles must be uncovered.

This known process is time-consuming and therefore not very efficient and, additionally, a differently shaped receiving element in the electrolytic bath is required for each type of brushing tool.

SUMMARY OF THE INVENTION

It is therefore an object of the present invention to provide a method and a device by means of which metal wires partially covered with abrasive particles, and thus brushing tools and other cutting tools, can be manufactured in a considerably more efficient manner.

Thus, in accordance with the invention, first metal wires partially covered with abrasive particles are manufactured which, when they are covered with abrasive particles either at their free ends or in sections along their entire length, result in the corresponding cutting tool such as, for example a brushing tool or a sawing wire, or are assembled to form it. This is a considerably more efficient manufacturing of such cutting tools, because a plurality of the metal wires can be covered with abrasive particles without having to take into consideration the particular dimensions of the cutting tools into which they are to be assembled later. For this reason, generally fewer devices or receiving elements will suffice. The devices according to the invention are manufactured in a simple way and the steps which are taken to only cover particular areas of the metal wires with abrasive particles are less time-consuming and can, in general, be taken uniformly. The same is correspondingly true for bristles, because they are each manufactured in pairs and preferably simultaneously in large numbers in the form of a strand.

By means of a holder manufactured of porous ceramic having areas on which areas of the metal wire to be kept free of abrasive particle rest or a coil body provided with a plurality of adjacent longitudinal grooves evenly distributed over the circumference it is provided in an advantageous manner that the holder for the electrolyte of the electrolytic bath is permeable, so that a directed coating or covering of the metal wires is possible. At the same time, this actively results in that areas of the metal wires not to be covered have practically no contact with the electrolyte. In a practical manner the support is covered with a laquer as an insulating layer in the respective areas.

The holder can be provided either as a coil or a plate-like body, it being possible in the first instance to manufacture bristles for brushing tools as well as sawing wires, in the second instance only bristles.

In order to achieve a higher charge exchange in the electrolytic bath, the coil body is provided with a recess in those areas on which rest the areas of the metal wire to be coated with abrasive particles, or the holder is made of a porous ceramic substance and in that those areas of the holder, on which rest the areas of the metal wire to be kept free of abrasive particles, are covered with an insulting layer, or the plate-like body is equipped on its edge with a bezel each in those areas above rest the areas of the metal wire segments to be covered with abrasive particles, or the plate-like body is also centrally provided with a recess parallel to the bezel.

Winding of the metal wire on the coil body in the form of a screw thread results in it being possible to equip the coil body in an automatic manner with a considerable length of metal wire which correspondingly can be covered with abrasive particles in one operation. In other words, in connection with the manufacture of brushing tools this means that there is the opportunity of the simultaneous manufacture of a large amount of bristles and, in connection with the manufacture of sawing wire there is the chance of covering any desired length of sawing wire with abrasive particles. The slope of the metal wire winding disposed on the coil body depends on just that interval at which the indivdual coils do not form metal bridges.

It is practical for the manufacture of bristles to cut the at least one metal wire secured by covering elements between two adjacent covering elements, or to cut the wound metal wire above the longitudinal grooves disposed over the circumference of the coil body at intervals corresponding to the desired length(s) of the bristles so that it is possible to manufacture in one step per coil of the metal wire wound on the coil body a plurality of bristles, covered on the free ends with abrasive particles. It is understood that the cutting of the metal wires is done in such a manner that, after cutting the free ends of the metal wire segments made in this way, which are opposite from each other, they have a distance from each other which is sufficient to prevent metal bridges between the two opposite ends which are to be covered.

In accordance with a further preferred exemplary embodiment of the present invention, at least one metal wire applied to the holder is soldered in the area of the covering elements to a longitudinally extending support wire maintained on the coil body, or the wound metal wire is fixedly fastened, preferably soldered, to support wire fastened on the coil body and disposed between the areas to be and the areas covered by the covering elements, or the metal wire segments are inserted in crosswise grooves and are fixedly fastened, preferably soldered, between bezels or between a bezel and the recess to a support wire disposed in a lower, parallel longitudinal recess. In this manner several covered wire strands are created in the shape of double bristles fixed on a support wire at intervals, the free ends of which are covered with the abrasive particles.

By providing several metal wire segments at intervals, the tips of which are provided with caps of abrasive particles, and/or with the metal wire segments on at least one support wire being correspondingly deformed, it is possible in a simple manner to form respective brushing tools from such a covered wire strand.

The bristles of a pair can be equally long when the support wire is symmetrically disposed between the areas to be cut or the bristle pair is maintained symmetrically on the support wire. If, the support wire is asymmetrically disposed between the areas to be cut or the bristle pair is maintained asymmetrically on the support wire, in accordance with and the bristle of a pair are of different length, this has the advantage that the bristles wear off in sequence.

Practical embodiments and dispositions of the coil body or plate-like body and of the support wire on the coil body or plate-like body and of the areas where the wire is cut result when the support wire is inserted in a longitudinal recess in the coil body, or the longitudinal recesses for the support wires and the longitudinal grooves with the metal wire areas to be cut are provided at the corners or at each side of the coil body which is approximately square in cross section, or the metal wire segments are inserted in crosswise grooves and are fixedly fastened, preferably soldered, between bezels or between a bezel and the recess to a support wire disposed in a lower parallel longitudinal recess.

A practical manner of fastening the covering elements results from the provision of several elongated covering elements in the shape of shell-like or angled strips distributed over the circumference of the coil body and fastened to the coil body by means of ring elements which can be fastened to the front.

In accordance with a further preferred exemplary embodiment of the present invention, and in particular for the manufacture of sawing wires the coil body is provided with a plurality of adjacent longitudinal grooves evenly distributed over the circumference, or the coil body is provided with a plurality of longitudinal grooves closely adjacent to each other and evenly distributed over the circumference, and in that over the coil body wound with the metal wire a hollow covering element is pushed without having much play, and is provided with slit recesses aligned with the longitudinal grooves.

A simple coiling of a metal wire on the coil body is the result, if the coil body is provided with an annular groove extending in the form of a screw thread into which the metal wire is inserted. To achieve an improved charge exchange for the covering of the metal wire with abrasive particles the axial longitudinal grooves are deeper than the spiral annular groove.

A practical design of the coil body and the covering element results from both the coil body and the covering element being cylindrical By making the covering element of transparent plastic, it is achieved that those areas on the coil body also can be observed, which are intended to be kept free of abrasive particles and are therefore covered.

BRIEF DESCRIPTION OF THE DRAWINGS

Further details of the invention can be seen in the ensuing description in which the invention is further described and explained by means of the exemplary embodiments illustrated in the drawings.

DETAILED DESCRIPTION OF THE PREFERRED EMBODIMENTS

The device 11 or 111 in accordance with first exemplary embodiment of the invention shown in FIGS. 1 to 6 is used for manufacturing metal wires partially covered with abrasive particles of, for example, steel, in the form of bristles for producing or assembling brushing tools, for example in the form of round brushes, flat brushes, roller brushes or the like or for tools for brush honing.

Figure 1A:
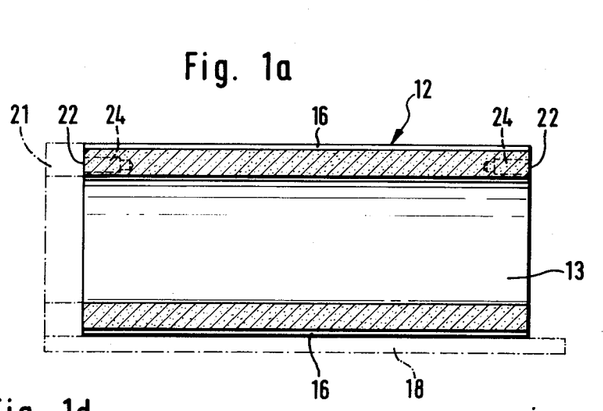
FIGS. 1a to 1e show the several parts of a device for the manufacture of metal wires partially covered with abrasive particles in the form of bristles for brushing tools, namely, partial figure a a coil body in longitudinal section, partial figure b the coil body in a front view, partial figure c an end ring in longitudinal section, partial figure d a covering angle strip in a side view and partial figure e the covering angle strip in a front view, in accordance with a first exemplary embodiment of the present invention.
Figures 1B, 1E:
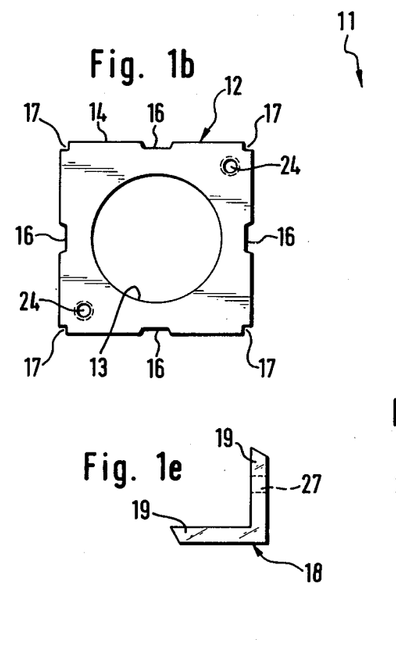

The device 11 has a holder 12 in the shape of a coil body of a porous ceramic material. The coil body 12 is elongated, has an approximately square cross section and has been provided with a continuous central bore 13 in the longitudinal center. Over its entire length the coil body 12 has on each of its long sides 14 a longitudinally extending trough-like groove 16 with sides obliquely inclined towards the outside. Each longitudinal groove 16 is disposed in the area of the center of the lateral side of the associated long side 14. Additionally, the coil body 12 has a longitudinal recess 17 extending over its entire length on each of the edges formed by two long sides 14 disposed at right angles to each other.

Figure 1C:
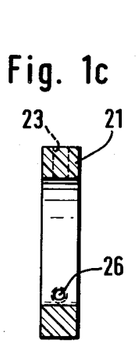
Figure 1D:
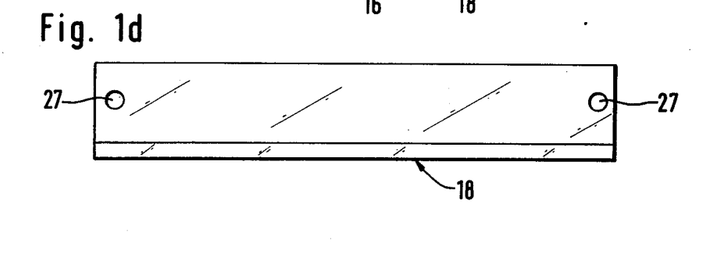

Furthermore, the device 11 has a total of four covering strips 18, angular in cross section, made of a transparent or translucent plastic. The covering strip 18 has two legs 19 of approximately the same width which are such that when the covering strip 18 (see FIG. 2) is applied to the edge area of the coil body 12 provided with the longitudinal recess 17, the longitudinal edges of the legs 19 terminate at a short distance from the adjacent edge of the longitudinal groove 16, so that the longitudinal groove 16 is not covered over by the covering strips 18.

The device 11 furthermore has preferably two fastening rings 21, the cross section of which corresponds to that of the coil body 12 and which can be fastened to the front faces 22 of the coil body 12. For this purpose each fastening ring 21 has two diagonally opposed bores 23 which are aligned with threaded bores in the front faces 22 of the coil body 12. Thus the fastening rings 21 can be screwed to the front faces of the coil body 12 by means of screws. The covering strips 18 are screwed to the fastening rings 21, the fastening rings 21 having radial threaded bores 26 and the covering strips 18 corresponding bores 27 which are in alignment with them in the assembled state.

The coil body 12 has been provided with an insulating cover 28 in the form of lacquer on all its outer surface areas of the long sides 14, with the exception of the three limiting surfaces of the trough-like longitudinal groves 16 and the inner wall of the longitudinal bore 13. On the one side the longitudinal bore 13 is adapted for receiving an axle or shaft during winding of the coil body 12 with a metal wire, for example a steel wire 29, and on the other side for receiving of an electrode, not shown, when the metal wire 29 is to be covered with abrasive particles by means of electrolytic metal deposition in an electrolytic bath.

To make it possible to cover the metal wire 29 with abrasive particles for the manufacture of bristles for brushing tools or the like, it is wound approximately spirally onto the coil body 12 over its entire length. Metal wire with a diameter of 0.03 mm or larger can be used. The slope of the winding of the metal wire 29 on the coil body 12 is such that a minimum interval of approximately 0.5 mm between the individual coils is maintained in order to avoid bridges of metal precipitate between two neighboring coils. Winding of the metal wire 29 onto the coil body 12 takes place after a support wire 31 has been inserted in each of the longitudinal recesses 14; to anchor the support wires 31 during the winding process they will be connected with each other on one or both ends. If the metal wire 29 is subjected to an electrolytic metal deposition in an electrolytic bath, the support wires are connected to the positive pole of the current supply. The winding process can take place automatically on a winding machine, the rate of feed determining the distance of the coils of the metal wire winding. After termination of the winding process (see FIG. 2) the metal wire 29 is fixedly attached, preferably soldered, to the support wire 31 at the places 32 where it crosses the support wire 31.

Figure 2:
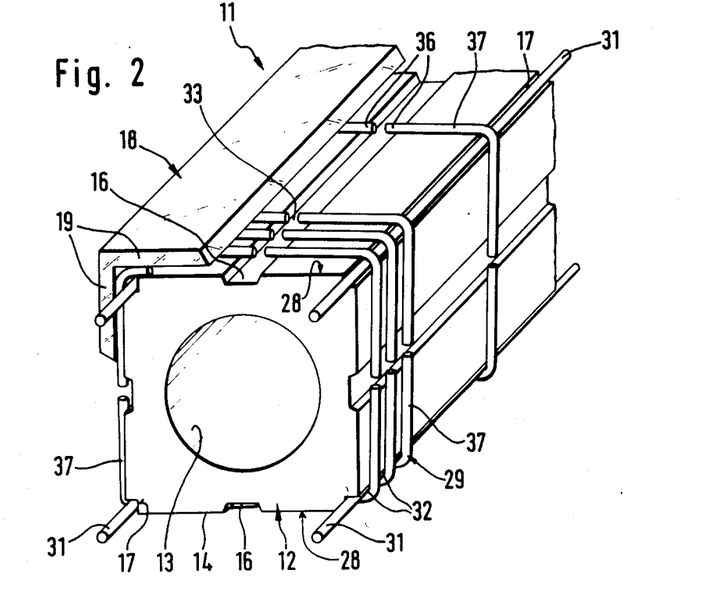
FIG. 2 shows the assembled device in accordance with FIG. 1 in a schematic, partially cut perspective view with a wound metal wire prior to insertion into an electrolytic bath for covering the free ends of the metal wire segments with abrasive particles.

Then the metal wire 29 wound on the coil body 12 is cut apart at all those places 33 which are opposite the trough-like longitudinal groves 16. The cutting is done, for example with the aid of a cutting wheel, in such a way that the free ends 36 of the resultant angular metal wire segments 37 are opposite each other by a distance of, for example, 0.5 mm to prevent metal bridges between these free ends 36. The distance of the free ends 36 of the metal wire segments 37 from each other is smaller than the width of the longitudinal groove 16. Then the covering angle strips 18 are applied at all four corners and are fastened on the coil body 12 with the aid of the fastening rings 21, so that the metal wire segments 37 are covered in all areas which are not to be coated or not to be covered with abrasive particles.

With the aid of the device 11 the metal wire 29 is now subjected to a process for covering the free ends 36 of the metal wire segments 37 with abrasive particles in an electrolytic bath, which process will be described in detail further below. After this coating or covering process in the galvanic bath, be it electrolytic or currentless, the free ends 36 of the angular segments 37 of the metal wire 29 are provided with caps 38, which consist of an electrolytically precipitable metal, such as, for example, Ni, Cu, or the like as carrier substance 39 and abrasive particles 41 partially embedded therein of, for example, diamond, CBN, corundum, silicon carbide or the like. The individual segments 37 are still soldered to the support wire 31 so that the result, with the aid of the device 11, is several (in this case four) covered wire strands 42 visible in FIG. 3, from which one or several brushing tools can be directly produced. To produce a brushing tool, both equally long legs of the metal wire segments 37 of one or several such covered wire strands 42 which laterally extend from the support wire 31 and are covered at their ends are bent accordingly. Mounting of the covered wire strand(s) 42 on a shaft or a disk of a brushing tool can be made as desired by clamping, soldering, or the like.

Figures 4, 5:
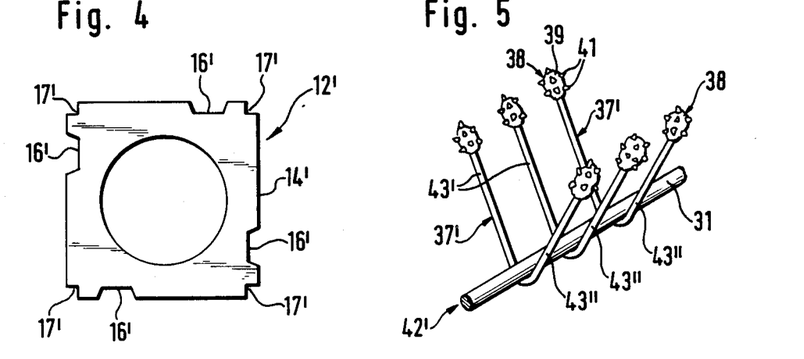
FIG. 4 shows a frontal view of a coil body in accordance with a variant of the device of FIG. 1 or partial FIG. 1c.
FIG. 5 shows in cut perspective view a covered strand in which, in a variant of the covered strand of FIG. 3, the metal wire segments are assymetrically fixed on the support wire.

FIG. 4 illustrates a variant of the coil body 12 in the shape of a coil body 12' having the same basic shape as the coil body 12 in accordance with FIG. 1. The essential difference between the coil body 12', also equipped with a central bore 13, and that of FIG. 1, consists in that the longitudinal grooves 16', opposite of which the areas 33 of the metal wire 29 which are to be cut are disposed, are provided in the center of the outside of the long sides 14' of the coil body 12', again a longitudinal recess 17' being provided on the edges of the coil body 12'. This means that starting from the respective support wire 31 to be inserted into the longitudinal recess 17', the corresponding leg 43 or 43'' of a metal wire segment 37' is of different length. The metal wire segments 37' are of the same length in comparison with each other.

In accordance with FIG. 5 this results in a covered wire strand 42' in which the two legs 43' and 43'' of the metal wire segments 37', which extend from the support wire 31 and are provided on their ends with caps 38, are of different length. By means of this, brushing tools with bristles of different lengths can be manufactured, the cap(s) 38 of which can wear off sequentially. It is to be understood that in FIGS. 4 and 5 the different lengths are only schematically indicated, i.e. that the lengths of the legs 43' and 43'' differ at most by a length corresponding to the height of the caps 38.

Figure 6:
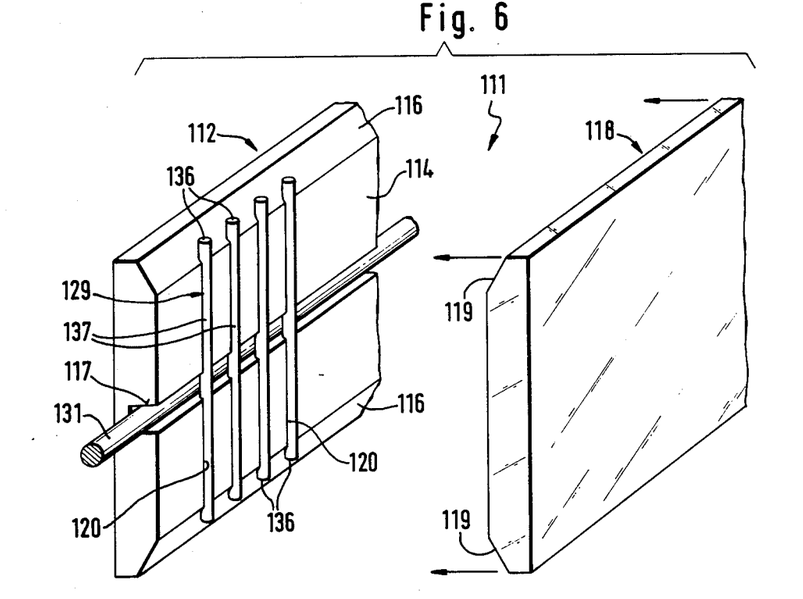
FIG. 6 shows in a schematic, partially cut perspective view a device with metal wire segments attached, prior to applying a covering element in accordance with a variant of the device in accordance with FIG. 2, FIGS. 7a to c show a device for the manufacture of metal wires partially covered with abrasive particles in the form of sawing wires for, for instance, endless band saws, namely in partial figure a the assembled device in longitudinal section without metal wire, in partial figure b a front view of the device and in partial figure c a portion of in accordance with rectangle C of partial figure a, in accordance with a second exemplary embodiment of the present invention.

FIG. 6 shows a device 111 having a holder 112 in the form of a plate-like body of porous ceramic material. The plate-like body 112 has an elongated rectangular cross section and has, extending over the edge of its entire length, a bezel 116 on each one of its wide long sides 114. Centrally between the two bezels 116 is a longitudinal groove 117 into which a support wire 131 has been inserted. Vertically to the longitudinal recess 117 which is parallel to the bezels 116, parallel grooves 120 are provided, into which are inserted segments 137 of a metal wire 129 and are soldered to the support wire 1 31. It is to be understood that the longitudinal recess 117 is deeper than the grooves 120. The metal wire segments 137 are long enough for their free ends, which are to be covered, to be located in the area of the bezels 116. In this plate-like body 112, too, all those areas, on which abut the areas of the metal wire segments 137 which are not to be covered with the carrier substance and the abrasive particles, are covered with an insulating lacquer. The same is true for the longitudinal recess 117.

A covering plate 118 made of a transparent or translucent plastic is fittingly placed on the plate-like-body 112; then the plates 112 and 118 are connected with each other in a suitable manner. The covering plate 118 also has bezels 119 located opposite the bezels 116 of the plate-like body 112, so that the free ends 136 of the metal wire segments 137 to be covered with a carrier substance and abrasive particles remain uncovered in the longitudinal groove thus formed by the two bezels.

Compared to FIG. 6, the plate-like body 112 in accordance with a variant not shown can be wider many times over so that the longer metal wire segments can be cut in their respective areas by means of interspersed longitudinal recesses, so that by means of this plate-like body a correspondingly increased number of metal wire segments can be covered with the carrier substance and the abrasive particles or caps.

Figure 3:
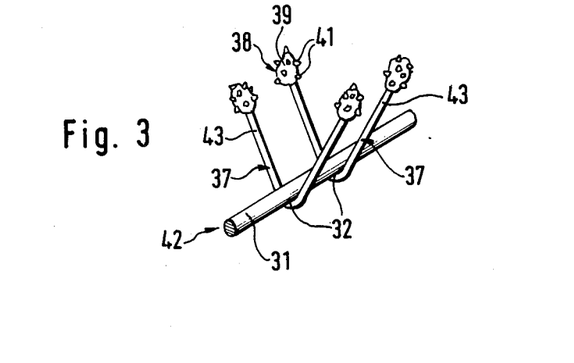
FIG. 3 shows a covered wire strand in cut perspective view in which the free ends of the metal wire segments are covered with a cap provided with abrasive particles.

Furthermore, the longitudinal recesses for the support wires can also be disposed in the center of the outside so that instead of covered wire strands 142 in accordance with FIG. 3, covered wire strands 42 in accordance with FIG. 5 result.

It is also possible, in accordance with a variant not shown, to equip both sides of the plate-like body of the device 111 with metal wire segments and to provide it on both sides with a corresponding covering plate prior to inserting it into an electrolytic bath.

It is to be understood that this device 111, too, is subjected in accordance with both variants to the same coating or covering process in the electrolytic bath in order to provide the free ends of the metal wire segments with caps 38.

Figures 7A, 7B, 7C:
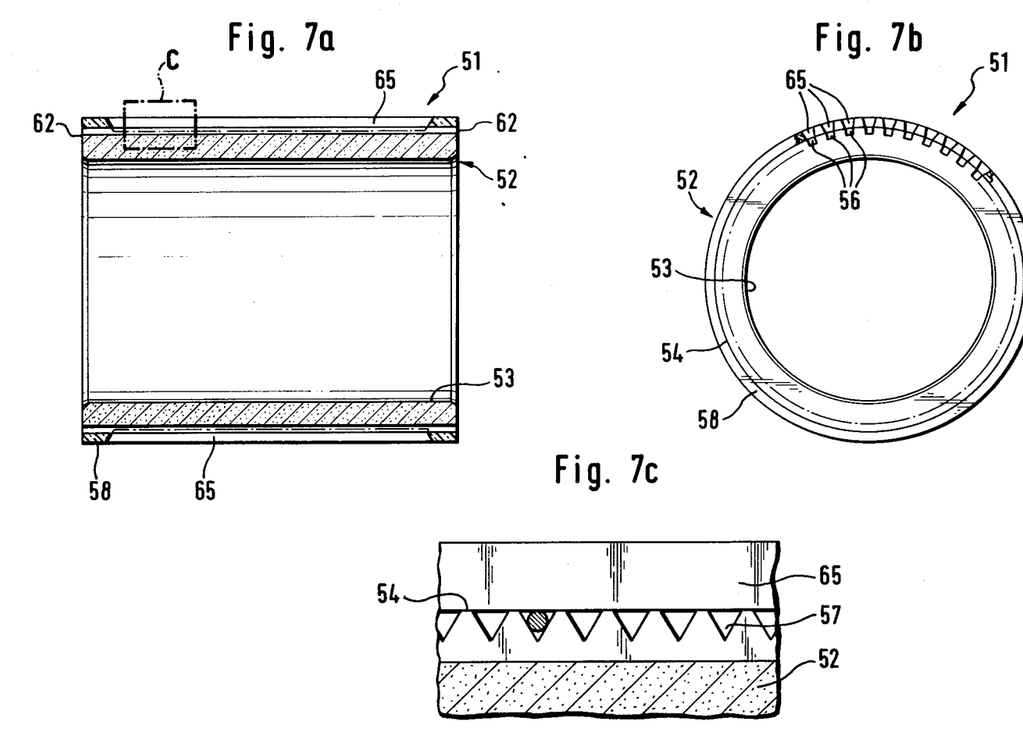
Figure 8:
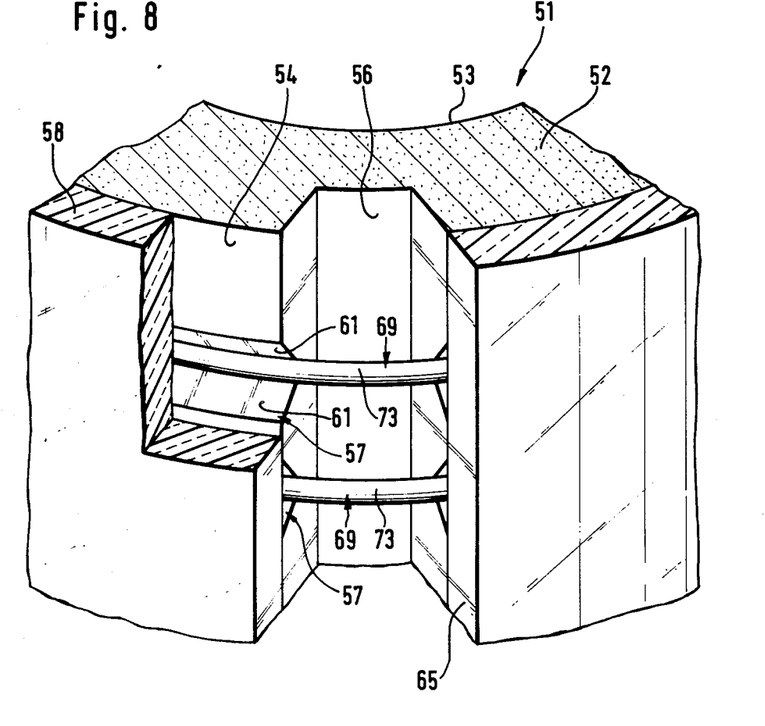
FIG. 8 shows in a schematic, partially broken and cut perspective view the device in accordance with FIG. 7, however, wound with a metal wire, prior to insertion into an electrolytic bath for the covering of segments of the metal wire with abrasive particles.

The device 51 in accordance with a second exemplary embodiment illustrated in FIGS. 7 and 8 is used for manufacturing metal wires partially covered with abrasive particles, for example made of steel, in the form of sawing wires 55 (FIG. 9) for use in, for example, endless band saws. The device 51 has a hollow-cylindrical coil body 52 which is also made of a porous ceramic material. Around its outer circumference 54 the coil cylinder 51, which is provided with a central bore 53, has a plurality of longitudinal grooves 56 extending over its entire length which may be rectangular or even trapezoid in cross section. The longitudinal grooves 56 are disposed at small intervals next to each other. In the exemplary embodiment, approximately 48 longitudinal grooves are disposed across the outer circumference 54 of a coil cylinder 52 having an outer diameter of 200 mm.

Furthermore, the coil cylinder 52 has on its outer circumference 54 an annular groove, disposed in the form of a screw thread and intersecting the axial longitudinal grooves 56, which also extends in general across the entire axial length of the coil cylinder 52. The annular groove 57 is approximately equilaterally triangular in cross section and has an inclination of, for example, 1.5. The depth of the annular groove 57 depends on the diameter of the steel or metal wire 69 to be covered which is inserted into the annular groove 57 without protruding. The axial longitudinal grooves 56 are deeper than the annular groove 57.

Figure 9:
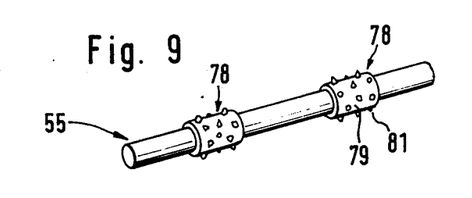
FIG. 9 shows in schematic perspective view a part of a metal wire in the form of a sawing wire, covered with abrasive particles in segments.

Into the annular groove 57, which is interrupted by the evenly disposed axial longitudinal grooves 56, a metal wire 69 is inserted in the form of a spiral, it being possible to coat the annular groove 57 with an insulating layer in the form of lacquer in those areas 61 which are located between the axial longitudinal grooves 56 in order to prevent the metal wire 69 from being coated with a carrier substance or covered with abrasive particles in these areas. In contrast hereto the metal wire 69 crosses the longitudinal grooves 56 like a bridge, so that in these areas 73 the metal wire 69 is covered with wide rings 78 which consist of an electrolytically precipitable metal, such as, for example, Ni, Cu, or the like as carrier substance 79 and abrasive particles 81 partially embedded therein of, for example, diamond, CBN, corundum, silicon carbide or the like.

In order to attain such an intermittent coating or covering of the metal wire 69 for the production of a sawing wire 55, the coil cylinder 52 wound with the metal wire 69 is provided with a covering cylinder 58 prior to insertion into the electrolytic bath, which in general is pushed without free play over the outer circumference 55 of the coil cylinder 53. The covering cylinder 58 which is made of a transparent or translucent plastic has approximately the same length as the coil cylinder 52 and can, for example, be disposed frictionally engaged on the coil cylinder 52. It is to be understood that other steps may also be taken to maintain the covering cylinder 58 immovably on the coil cylinder 52 in an electrolytic bath during coating or covering of the metal wire 69.

The covering cylinder 58 has, opposite of the axial longitudinal grooves 56 or aligned with these, axially extending slits 65 which may also be either rectangular or trapezoidal in cross section. The slits 65 extending from the outside to the inside are provided in the same number as the axial longitudinal grooves 56 and extend close to the two front faces 62 of the covering cylinder 58.

Coating of the respective areas 36 or 73 of the metal wires 29, 69, 129 with the carrier substance and covering with abrasive particles in an electrolytic bath, using the device 11, 111 or 51 as an aid, takes place as follows. It should be mentioned beforehand that this galvanizing process can take place either electrolytically, i.e. with the aid of an outside source of electricity, or without current, i.e. chemically with the aid of reduction means, stabilizers and catalysts in an electrolytic bath. Here described is, for example, the galvanic bath activated by a source of electricity.

After the metal wire 29, 129, 69 has been suitably cleaned, placed on the coil body 12, 52 and the device 11, 111, 51 has been accordingly finished with the covering elements 18, 118, 58, the required protective lacquer coating being present on the coil body 12, 52 or the plate-like body 112, the device 11, 111, 51 is inserted into a metal bath or nickel bath for the deposition of a bonding layer of nickel of 3 to 5 $\mu$m. This bath consists of, for example, nickel sulfate with approximately 50 to 60% nickel which is present in crystalline form and is dissolved in water when the bath is prepared. Two steel plates serving as anodes are present in the bath which are connected with the positive pole of a DCsource. The metal wire 29, 129, 69 is cathodically poled, if suitable via the support wires 31, 131, i.e. it is connected with the negative pole of the DC-source. By means of the electrolytic process nickel is deposited on the uncovered surface areas 36, 73 of the metal wire 29, 129, 69. To keep the proportion of nickel in the bath constant there is provided, for example, a nickel plate in the bath from which nickel dissolves into solution by charge exchange.

Then the device 11, 111, 51 with the metal wire 29, 129, 69, coated with a nickel coating in the respective areas 36, 73, is brought into a bath of abrasive particles, for example a diamond bath. A nickel element connected to the anode, for example in the form of a nickel plate or of a nickel rod inserted into the bore 13, 53 of the coil body 12, 52. The abrasive means to be applied, for example diamond grains of uniform size, is contained in the bath. The device 11, 111, 51 is dipped into the bath such that the areas 36, 73 of the metal wires 29, 129, 69 which are to be coated in the bath are located in the diamond sediment. Because of the continuing nickel coating process on the basis of the permeability to electrolyte of the porous ceramic material of the coil body 12, 52 or of the plate-like body 112, the diamond grains are firmly fixed on the metal wire by metal or nickel bridges.

After the diamond grains used as abrasive have adhered in the diamond bath to the respective areas of the metal wire, additional metal or nickel material is deposited during a subsequent nickel bath (i.e. a further electrolytic bath) on the areas 36, 73 covered with abrasive particles of the metal wires 29, 129, 69, in order to impart to the abrasive particles a high degree of adhesion on the metal wire. The abrasive particles or diamond grains are at least semi-imbedded in the nickel such that they extend out of the carrier substance, in this case nickel, no more than a quarter or a third of their size. It is understood that abrasive particles have been completely embedded inside the carrier substance. The electrolytic process is conducted in the nickel bath with oscillating movement of the device 11, 111, 51. After application of the nickel, the device 11, 111, 51 is cleaned with distilled water and then dried.

At the end of this process the abrasive particles or diamond particles are fixed in the carrier substance in such a way that they can be used as abrasives and have a very long life as such. A certain amount of wear is compensated by the cap 38 or the rings 38 having a certain size and by additional abrasive particles being provided inside the cap or the rings which are exposed during wear and become usable.

It is to be understood that the abrasive particles can also be embedded in another metal, such as for example Cu, and that this process takes place in a corresponding manner in electrolytic baths.

I claim:

1. A method for the manufacture of metal wire partially covered with abrasive particles for cutting tools, comprising the steps of:
   mounting at least one metal wire to be covered on a holder;
   covering those areas of said at least one metal wire which are to be kept free of abrasive particles with one or more covering elements; and
   dipping the holder with said at least one metal wire and the covering element into an electrolytic bath, into which abrasive particles have been introduced, wherein the uncovered areas of said at least one metal wire are coated with a layer of metallic carrier substance and partial embedding of a plurality of abrasive particles by means of galvanic metal precipitation.

2. The method as defined in claim 1, further comprising the steps of:
   manufacturing the holder of porous ceramic material; and
   coating those areas of the holder, on which the areas of said at least one metal wire to be kept free of abrasive particles rest, with an insulating layer.

3. The method as defined in claim 1, further comprising the steps of:
   providing a coil body as the holder; and
   placing said at least one metal wire on the circumference of the coil body.

4. The method as defined in claim 3, further comprising the step of:
   providing a recess in the coil body in those areas on which the areas of said at least one metal wire to be coated with abrasive particles rest.

5. The method as defined in claim 3, further comprising the step of:
   winding said at least one metal wire on the coil body in the form of a screw thread.

6. The method as defined in claim 1, further comprising the step of:
   cutting said at least one metal wire between two adjacent covering elements.

7. The method as defined in claim 6, further comprising the steps of:
   providing a longitudinally extending support wire on the holder; and
   soldering said at least one metal wire to the support wire in the area of the covering elements.

8. The method as defined in claim 7, further comprising the step of:
   providing the support wire with a plurality of metal wire segments at intervals, said plurality of metal wires having caps of abrasive particles at their tips.

9. The method as defined in claim 8, further comprising the step of:
   deforming the plurality of metal wire segments on at least one support wire.

10. The method as defined in claim 1, further comprising the steps of:
    providing a plate-like body as the holder; and
    placing a plurality of metal wires in parallel arrangement on said plate-like body.

11. The method as defined in claim 10, further comprising the step of:
    cutting said plurality of metal wires between adjacent covering elements.

12. The method as defined in claim 11, further comprising the steps of:
    providing a longitudinally extending support wire on the holder; and
    soldering the plurality of metal wires to the support wire.

13. The method as defined in claim 12, further comprising the step of:
    providing the plurality of metal wires with caps of abrasive particles at their tips.

14. The method as defined in claim 13, further comprising the step of:
    deforming the plurality of metal wires on at least one support wire.

* * * * *